United States Patent [19]

Gey et al.

[11] 4,069,194

[45] Jan. 17, 1978

[54] PROCESS FOR THE SOLID STATE POLYCONDENSATION OF LINEAR POLYESTERS

[75] Inventors: Werner Gey, Offenbach (Main); Wolfgang Langhauser, Bergen-Enkheim; Helmut Heinze, Frankfurt am Main; Hans-Joachim Rothe, Bischofsheim; Peter Freund, Bad Vilbel, all of Germany

[73] Assignee: Zimmer Aktiengesellschaft, Frankfurt, Germany

[21] Appl. No.: 629,806

[22] Filed: Nov. 7, 1975

[30] Foreign Application Priority Data

Nov. 12, 1974 Germany ............................ 2453577

[51] Int. Cl.$^2$ ................................................ C08K 7/20
[52] U.S. Cl. ................................. 260/40 R; 260/75 T
[58] Field of Search ............ 260/40 R, 75 T, DIG. 35

[56] References Cited

U.S. PATENT DOCUMENTS

| 3,305,532 | 2/1967 | Middleburg et al. ............. 260/75 T |
| 3,544,523 | 12/1970 | Maxion ............................ 260/75 T |
| 3,583,935 | 6/1971 | Weissermel et al. .......... 260/40 R X |
| 3,621,074 | 11/1971 | Siggel et al. ................ 260/75 EP X |
| 3,634,359 | 1/1972 | Breitschaft et al. ............... 260/75 T |
| 3,876,608 | 4/1975 | Anderson et al. ................ 260/40 R |

FOREIGN PATENT DOCUMENTS 1,010,043   11/1965   United Kingdom ............. 260/40 R Primary Examiner—Sandra M. Person
Attorney, Agent, or Firm—Allegretti, Newitt, Witcoff & McAndrews

[57] ABSTRACT

A separating or anticaking agent consisting of spherical glass particles having a diameter of 3 to 30µ is added to polyester resin granulates to prevent agglomeration during solid state polycondensation in a plug-flow reactor. Thin-walled articles formed from the end product are characterized by high strength, high transparency, crystal clear color, good gas impermeability and a smooth surface.

4 Claims, No Drawings

PROCESS FOR THE SOLID STATE POLYCONDENSATION OF LINEAR POLYESTERS

BACKGROUND OF THE INVENTION

The invention relates to a process for the solid-phase polycondensation of linear polyesters, especially of polyethylene terephthalate, which are continuously moved through a reaction vessel in granulated form in an inert gas stream at temperatures of 30° to 5° C below the melting point, sticking of the granulates being prevented by addition of fine-particle glass as an anticaking agent.

Polyethylene terephthalate can be condensed in the melt in autoclaves up to an intrinsic viscosity of maximally 0.7 and in reactors of special construction up to an intrinsic viscosity of 0.9, maximally 1.0, without suffering any substantial thermal damage. For certain purposes of use, however, a higher molecular weight is required, i.e., a higher intrinsic viscosity than is possible by condensation in the melt. In various technical areas there is an increasing need to replace inorganic materials with synthetic substances of especially high strength. By reason of a large number of favorable properties, including, for example, the lower density, there are many uses for high-molecular substances such as polyethylene terephthalate, polybutylene terephthalate, polyamides, etc. The strength of these resins depends on the molecular weight. An increase in the molecular weight over the limits set by the dynamic viscosity in the condensation in the melt can be achieved essentially only by a solid-state polymerization or polycondensation. For a number of uses polyethylene terephthalate having special properties is required, as for example, in the case of thin-walled packaging for foods. The requirements for this product will be discussed in detail below.

A number of continuous processes for solid-state polycondensation of polyethylene terephthalate are taught in the prior art.

German laid-open application OS No. 1,770,410 describes such a process, in which the granulate is moved by gravity in a plug flow. To be sure, as little as possible agglomeration is supposed to occur there, but it is proposed, through the admission of cold gas at the outlet of the reactor, to bring about a bursting apart of the particles, which nevertheless may be stuck together. The sticking obviously cannot be avoided completely. The process has the substantial disadvantage that the emergence of vapors such as the diol formed in the condensation is prevented at the agglutinated places because of the increase in the diffusion path length. As a consequence differing degrees of condensation occur in the various parts of the individual granulate particles, so that the end product has a very broad spectrum of viscosity or chain length.

During polycondensation an increase in density and a shrinkage in volume occurs and glacierlike cracks develop in the mass into which the granulate plunges from above. This results in the disadvantage that the otherwise plug-flow profile in the reactor space is disturbed, so that there is formed a polycondensation product of widely varied solution viscosity.

Discontinuous processes in which the granulate to be treated is prevented from agglutinating within a closed vessel by mechanical turning, for example, by agitating mechanisms, are not considered here, since other significant disadvantages arise, such as high power consumption and labor requirements, as well as a long reaction time. The trend, therefore, is toward carrying out the solid-state polycondensation continuously. Solid-state polycondensation processes which operate under high vacuum are excluded because of the problems of sealing the reaction space for continuous operation. Further, where leakage occurs there is a danger of the penetration of oxygen into the reaction chamber, whereby the polymer suffers damage by oxidation.

PRIOR ART

To avoid the above-described agglutination it has been proposed to carry out solid-state polycondensation in a fluidized layer under action with hot inert gases, for example, nitrogen. The required high residence times which, depending on the polycondensability and molecular weight of the starting material, desired molecular weight increase, particle size, etc., can amount to up to about 20 hours, results in an extremely high technical expenditure both with respect to the investment and energy requirements. Moreover fluidized layer processes lead to unfavorable residence-time spectra, and, therefore, can be operated only discontinuously.

In other known processes rotary pipes are used which are heated directly with hot inert gases. They, too, because of the long residence times, require a great expenditure in apparatus, in which connection there exists the additional problem of sealing the rotary pipe with respect to the stationary connections which is hardly possible to do reliably at the high operating temperatures. The residence time behavior does not correspond to the plug flow.

From the standpoints of the space-time yield, the investment costs and the energy requirements, a pipe operating as a "moving bed reactor", preferably with round cross section, is especially favorable. In operation, however, the agglutination tendency of the granulate described above creates great difficulties, since the polyester granulates, regardless of the starting viscosity and the degree of crystallization, have a marked tendency to agglutinate. It was ascertained that in the temperature range suitable for solid-state polycondensation, between 30° and 5° C below the melting point, there are virtually no conditions under which the polyester granulates can be moved without agglutination.

To avoid agglutination a known practice is to add so-called separating or anticaking agents to the granulate to be condensed. Known separating agents may range from liquids to solids, including solutions, dispersions, emulsions, etc. In German laid-open application OS No. 2,117,748 there are mentioned as solid or powder-form separating agents silicon dioxide and silicates. That specification makes no disclosure of geometry of the individual powder particles so that it is presumed that any form of the powder particles, including the irregular forms that arise in grinding processes, are deemed suitable. It has been found, however, that an arbitrary form of the powder does not by any means suffice for all uses of the end product because the separating agent as a rule remains in the end product.

Glass powders have also been disclosed as separating agents. However, these are subject to the same considerations as the powdered separating agents mentioned in German laid-open application No. 2,117,748.

To illustrate the inadequacy of known separating agents, consider the following series of criteria prescribed for thin-walled packages of polyethylene terephthalate. First of all, the tensile strength must be as high as possible, the degree of polycondensation should be as high as possible, so that the wall thickness of the package can be kept as thin as possible for the purpose of a low consumption of material. This presumes a high intrinsic viscosity above 1.0. Further, the polyethylene terephthalate should be colorless, i.e., there must not be admixed any coloring substance or substances which through thermal decomposition lead to a yellowing or favor the thermal decomposition of the polymer. Furthermore, the polyethylene terephthalate should be crystal clear, which precludes the addition of any clouding substances. In addition, crystallization in the final shaping must be suppressed, which means that crystallization-accelerating additives are not usable as separating agents. Also, it is frequently required that the package of polyethylene terephthalate be gas tight. There are cases conceivable in which a thin-walled shaped body has to withstand an internal pressure of 9 atmospheres of carbon dioxide without pressure loss over several weeks. For such purposes additives which promote the porosity of the polymers must be excluded, such as, for example, coarse-grained separating agents, or those that react chemically with the polyester and thereby tend to form agglomerates. Agglomerate-forming substances trap gases and are just as suitable as substances that give off gases on heating. Further, the polyethylene terephthalate end product should have a smooth surface, for optical reasons and for reasons of cleanliness or sterility. This requirement excludes separating agents by which the surface of the unshaped polymer is affected in the sense of roughening. Unusable, for example, are aerosil, gypsum, asbestos, silicates, etc. For the packing of foods, the polyethylene terephthalate must also be physiologically unobjectionable, i.e., the separating agent must neither be poisonous nor influence the taste of the package contents, for example, by an odor of its own. Finally, the packaging material must be both thermally and hydrolytically stable, so that the high degree of polycondensation remains preserved during the final shaping. This excludes separating agents which lower the stability or increase the -COOH concentration.

Underlying the invention, therefore, is the problem of providing a process for solid-state polycondensation of linear polyesters using a separating agent by which the above-mentioned criteria are met.

THE INVENTION

The solution to the problem posed is accomplished by admixing with the granulate before the granulate enters the reactor, 0.2 to 5% by weight of a glass powder of substantially spherical form with a diameter between 3 and $30\mu$.

It was found, surprisingly, that glass powder in the form of spheres in the indicated range of diameters satisfies all the requirements set. The indicated diameter range is of importance to achieve an ideal separating effect. Spheres with appreciably larger diameter were easily displaced from the contact surfaces between the granulate particles. Spheres with appreciably smaller diameter than $3\mu$ are easily completely impressed into the polyester granulate when the surface of the granulate reaches the softening point. Impression of the spheres is due to the static pressure of the column of granules and in consequence the efficiency of the spheres as anticaking agent is significantly reduced or completely eliminated. The expression "spherical" includes also a particle form that is very nearly spherical so that the same effect occurs. While the spherical form is achieved by way of the softening state of the glass, an approximately spherical form can be generated, for example, by mechanical reworking in a ball mill of irregular-shaped particles produced by a grinding process. Glass powders with only approximately spherical form sell for a lower price than more perfect spheres. In any case the glass powder useful in the invention is different from glass powder produced by a pure grinding process and which has an irregular splinter-shaped form.

Glass balls, in contrast to prior-known separating agents, behave advantageously as follows: spheres, in the melting up of the polyester produced by solid-state polycondensation, are enveloped by the melt which wets the particles on all sides. There is no loss of strength and no increase in the gas permeability of the packages, as would be the case with sharp-edged glass splinters. Irregularly-shaped glass powder (grinding product) holds air bubbles on the surface and, therefore, does not bond faultlessly with the polyester melt.

While irregular-shaped powder tends to agglomerate with inclusion of air and in this manner can reduce the wall thickness of the end product to the point where it becomes gas-permeable and loses appreciable strength, spherical glass powder has no tendency at all to form agglomerates and, therefore, is free of the disadvantages thereof.

Spheres form on the surface of the polymer granulate in exactly monoparticular layers, so that a uniform coating of the granulate is possible with a minimal quantity of separating agent. A smaller addition of separating agents improves the transparency of the end product, which matter will be gone into in more detail below.

Spherical glass powder, in contract to irregular glass powder, leads to a smooth surface in the end product even in areas not lying on a shaping wall. Hence a better appearance of the end products is achieved. Moreover, cleaning and sterilization of the surface is facilitated considerably.

Spheres have the smallest possible surface for a given volume. For this reason the phase boundary surface between the matrix of polyester and the separating agent is minimal. Aside from the extraordinarily good bonding between the matrix and separating agent, even with a severly deviating index of refraction, clouding occurs only to a very slight extent. The clouding is a function of the size of the phase boundary surface between the matrix and the incorporated separating agent, or other fillers.

Spheres, unlike other, irregularly shaped additives, do not accelerate the crystallization of the polyethylene terephthalate or at least not measurably. This property of the spherical separating agent is extremely important, because only amorphous polyethylene terephthalate is crystal clear. It is not possible to produce shaped bodies of high transparency if crystallization-accelerating substances are present in the polymer.

An advantage of glass not to be underestimated is that, in contrast to other separating agents mentioned, it can be produced with differing indices of refraction. It is possible in this manner to approximate the relative index of refraction $n_{rel}$ to the value 1, so that the clouding effect can be markedly reduced or eliminated entirely. Notation $n_{rel}$ is the quotient of $n_a$ and $n_p$ $n_a$ being the index of refraction of the separating agent and $n_p$ the index of refraction of the polyethylene terephthalate.

The size of the polyester granulate is not critical but is selected expediently between 1 and 5 mm, preferably between 2 and 4 mm, maximum dimension (length). With a smaller granulate the polycondensation time is shorter because of the shorter diffusion path within particles. On the other hand, the effectiveness of the separating agent must be greater and vice versa. The invention is explained in more detail in the following examples and comparative examples. Examples 1–5 are not in accordance with the invention.

EXAMPLE 1

Polyethylene terephthalate granulates of cylindrical form, having a length of 2.5 mm, a diameter of 2 mm, an intrinsic viscosity of 0.55, an index of refraction of N = 1.64 and a density of 1.40 (corresponding to a degree of crystallization of 53 to 55%) was added continuously to a solid-state poly-condensation reactor. The polycondensation reactor was a vertically-standing, tempered cylinder, having a height eight times its diameter.

Nitrogen at 240° C was blown into the reactor countercurrent to the polyethylene terephthalate flowing continuously from above. The throughput of the polyethylene terephthalate was adjusted to the dimensions of the reactor so that the residence time in the reaction space amounted to 8 hours. Initially the granulate was discharged from the reactor with an intrinsic viscosity of 1.05. Gradually, however, the granulate agglutinated in the reactor space to such a degree that a continuous discharge was no longer possible.

EXAMPLE 2

The experiment of Example 1 was repeated using nitrogen at a temperature of 230° C. After about 4 hours of operation the polyethylene terephthalate granulate was agglutinated to such a degree that the discharge took place irregularly and later stopped entirely.

EXAMPLE 3

The experiment according to Example 2 was repeated under the same process parameters, except the polyethylene terephthalate granulate had a density of 1.43 (corresponding to a crystallization degree of ca. 70%) and an intrinsic viscosity of 0.85. After 10 hours of operation the contents of the reactor were agglutinated to such a degree that the discharge of the reaction product came to a standstill.

From the above tests it was concluded that solid-state polycondensation in a "moving bed reactor" is not feasible without addition of separating agents.

EXAMPLE 4

Polybutylene terephthalate granulate of cylindrical form having a length of 3 mm and a diameter of 2. to 2.5 mm, and an intrinsic viscosity of 0.72 was supplied continuously at a temperature of 150° in a dry state (water content less than 0.01% by weight) to a solid-state polycondensation reactor. The reactor was a vertically-standing tempered cylinder, the height of which was eight times the diameter. Polybutylene terephthalate was fed into the reactor continuously from the top downward countercurrent to the flow of nitrogen at a temperature of 215° C. The throughput of the polybutylene terephthalate was matched to the dimensions of the reactor so that the residence time in the reaction space amounted to 6 hours. Initially granulate was discharged from the reactor with an intrinsic viscosity of 1.2. After about 30 hours of operation agglutinated particles appeared in the discharged polyester, and the viscosity of the discharged product spread over a range of 0.15 units, indicating a differing residence time in the reaction space because of agglutination.

EXAMPLE 5

Polyethylene terephthalate granulate of the nature mentioned in Example 1 was powdered in a drum mixer with 0.8% by weight of aerosil (finely granular silicic acid) and then, analogously to Example 1, subjected to a solid-state polycondensation. The product discharged from the reactor had an intrinsic viscosity of 1.04. Since no agglutination of the reactor content occurred, the process could be operated continuously.

The polyethylene terephthalate granulate produced in this manner was worked in a conventional manner and by means of conventional equipment into films. By reason of the at least partially-agglomerated aerosil and the unavoidable crystallization of the polyethylene terephthalate, the film was cloudy. The surface of the film was rough, and the gas tightness was only 90% of that of a comparable film without aerosil as separating agent. Because of the tendency to form agglomerates aerosil was deemed to be an unsatisfactory separating agent.

EXAMPLE 6

Polyethylene terephthalate granulate of the type and quality mentioned in Example 1 was powdered in a drum mixer at 130° C with 1.0% by weight of a spherical glass powder with a diameter of 5 to 25$\mu$ and an index of refraction of $n = 1.51$ and, analogously to Example 1, subjected to solid-state polycondensation during an 8 hour residence time.

The end product discharged from the reactor had an intrinsic viscosity of 1.05 and an index of refraction of $n = 1.72$. Agglutinations in the reactor were not detected, and the operation was continuous.

The polyethylene terephthalate produced in this manner was formed in conventional manner into thin-walled shaped parts, which showed only a slight clouding with fully smooth surface. The gas-tightness was equivalent to comparable shaped parts produced without separating agents.

It was determined that the use of glass powder in spherical form according to the invention produced good end products meeting all requirements.

EXAMPLE 7

Polyethylene terephthalate granulate of the same quality as in Example 1 was powdered, analogously to Example 6, with a spherical glass powder made from light flint glass with an index of refraction of $n = 1.72$. The sphere diameter ranged between 5 and 20$\mu$. The solid-state polycondensation was carried out analogously to Example 1 during an 8 hour residence time. The granulate discharged from the reactor has an intrinsic viscosity of 1.05. No agglutinations were found in the reactor.

From this product films were produced which were crystal clear and had a smooth, shiny surface after stretching. These films had the same strength and gas tightness as films of the same thickness without separating agents. By making the index of refraction of polymer equal to that of the separating agent a further advantage is achieved, namely, that of crystal clear transparency.

EXAMPLE 8

Polybutylene terephthalate granulate of the same quality as in Example 4 was powdered in a drum mixer at 130° C with 0.8% by weight of a spherical glass powder with a diameter between 5 and 25μ, and, analogously to Example 4, subjected to solid-state polycondensation. The end product discharged from the reactor after 6 hours residence had an intrinsic viscosity of 1.20. Agglutinations in the reactor were not detected. The operation was continuous. The polybutylene terephthalate produced in this manner was formed in conventional manner into thin-walled shaped parts which were only slightly cloudy with a completely smooth surface. The gas tightness was equivalent to that of comparable shaped parts produced from polymer without separating agents.

It was determined that the use of glass powder in spherical form according to the invention led to surprisingly good end products.

It is to be understood that the embodiment of the invention which has been described is merely illustrative of one application of the principles of the invention. Numerous modifications may be made to the disclosed embodiment without departing from the true spirit and scope of the invention.

We claim:

1. Process for solid-state polycondensation of linear polyesters in granulated form comprising moving the granulate in an inert gas stream at temperatures of 30° to 5° C below the melting point of the polymer continuously through a reaction vessel, and preventing agglutination of the granulate by an addition of fine-particle glass as a separating agent, characterized in the prior to entering the reactor there is admixed with the granulate 0.2 to 5% by weight of a glass powder having particles of substantially spherical form with a diameter between about 3 and 30μ.

2. Process according to claim 1, in which the polyester granulates range in size between about 1 and 5 mm maximum length.

3. Process according to claim 1 in which the spherical glass particles have a diameter between about 5 and 25μ, and the polyester granulates are between about 2 and 4 mm maximum length.

4. Process according to claim 1 wherein the indices of refraction of said spherical particles and said condensed polyester are substantially the same.

* * * * *